Patented Nov. 13, 1945

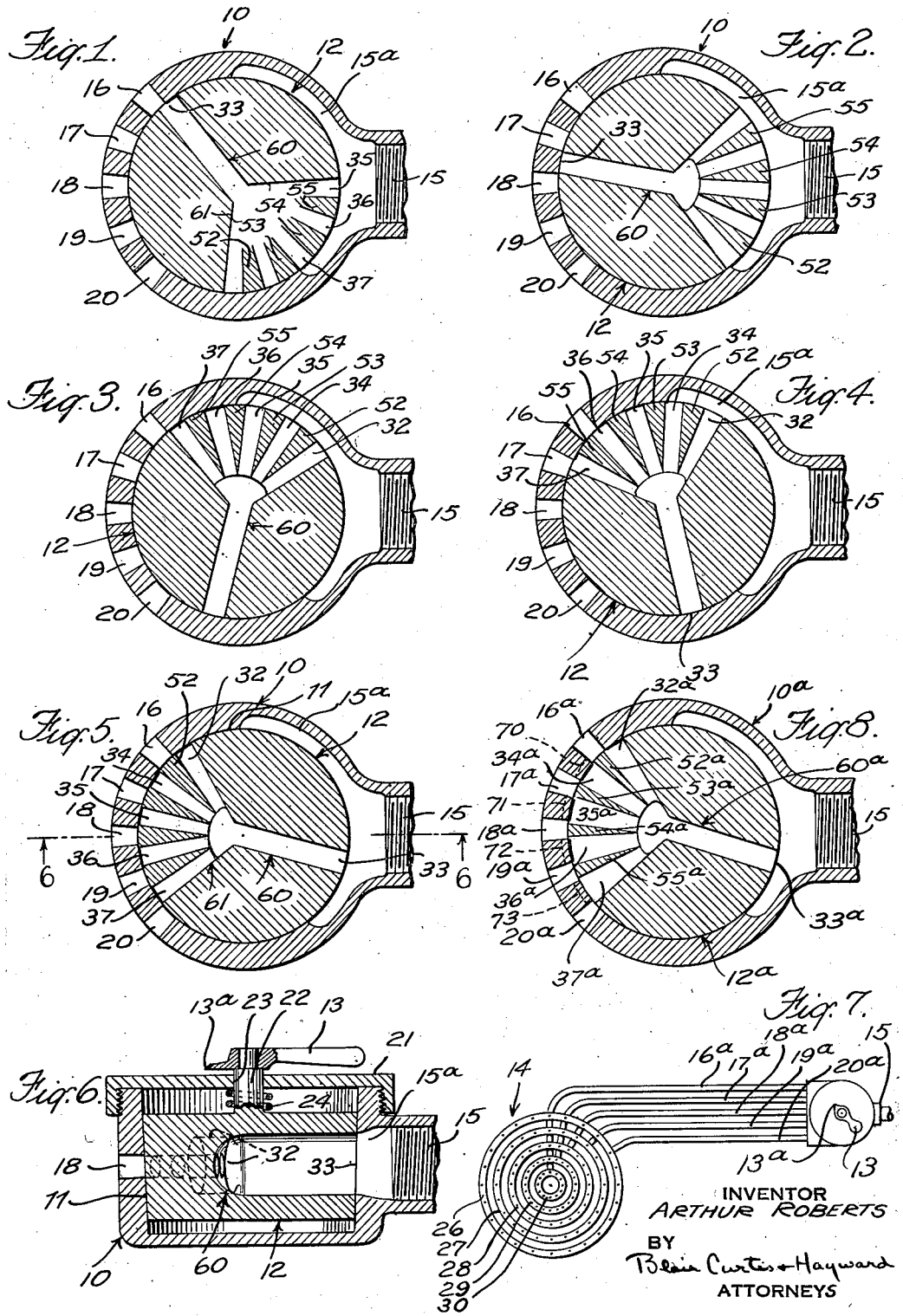

2,389,000

UNITED STATES PATENT OFFICE 2,389,000

VALVE CONSTRUCTION

Arthur Roberts, Cleveland Heights, Ohio, assignor to The Colonnade Company, Cleveland, Ohio, a corporation of Ohio Application October 21, 1943, Serial No. 507,187

6 Claims. (Cl. 251—107)

This invention relates to a valve construction and more particularly to a valve construction for controlling the flow of gas to the rings of a multiple-ring gas burner.

One of the objects of this invention is to provide a valve construction which is simple, thoroughly practical, and durable in use. Another object is to provide a construction of the above character which is economical to manufacture. A further object is to provide a construction of the above character by which the flow of gas to any individual or series of rings in a multiple-ring gas burner may be controlled. Other objects will be in part obvious and in part pointed out hereinafter.

The invention accordingly consists in the features of construction, combinations of elements, and arrangements of parts, as will be exemplified in the structure to be hereinafter described and the scope of the application of which will be indicated in the following claims.

In the accompanying drawing in which are shown several of the various possible embodiments of this invention, Figures 1–5 are horizontal sections taken through a valve embodying the present invention with the movable parts thereof positioned in different relative positions in each figure;

Figure 6 is a vertical section of the valve shown in Figures 1–5 taken on the line 6—6 of Figure 5;

Figure 7 is a diagrammatical plan view of the valve shown in Figures 1–6 connected to a multiple-ring gas burner; and Figure 8 is a horizontal section taken through another embodiment of my valve.

Similar reference characters refer to similar parts throughout the several views of the drawing.

This application is a continuation-in-part of my application for Valve construction, filed March 18, 1941, bearing Serial No. 383,905, now Patent No. 2,335,085, granted November 23, 1943.

Referring first to Figures 5 and 6, the valve preferably consists of a casing, generally indicated at 10, having a distributor plug, generally indicated at 12, rotatably mounted therein. Plug 12, which directs and controls the flow of gas or other fluid through the valve, is rotated by a handle 13. This valve which is particularly adapted for controlling the flow of gas to a multiple-ring gas burner, generally indicated at 14, (Figure 7), has an inlet port 15 (Figure 5) and a series of outlet ports 16, 17, 18, 19, and 20. The outlet ports are connected by pipes 16a, 17a, 18a, 19a, and 20a (Figure 7) to the rings 26, 27, 28, 29, and 30 of burner 14. By adjusting distributor plug 12, any individual outlet port may be connected to the inlet port and the degree of flow of gas to the selected port may be varied between open and closed positions. Furthermore, the outlet ports beginning with port 16 may be connected successively to the inlet port until they are all connected in unison to the inlet port and then the outlet ports may be successively closed beginning with port 16 by continued rotation of the distributor plug. The degree of flow of gas to any group of outlet ports may be varied between open and closed positions.

Referring to Figure 6, casing 10 has a bore 11 extending downwardly therein. This bore has a tapered side wall which forms a seat for the tapered side wall of distributor plug 12. Thus, the tapered side wall of the bore forms a bearing surface for the distributor plug, permitting rotation of the plug within the casing. The open end of bore 11 is covered by a cap 21 which is provided with threads complementary to threads on casing 10, permitting it to be screwed into position thereon. The stem 22 of plug 12 extends upwardly through a hole 23 (Figure 6) in cap 21 and handle 13 is secured to stem 22 in any suitable manner. Handle 13 is provided with a finger 13a which when used in conjunction with index markings (not shown) on the top surface of cap 21 enables the user of the valve to set the distributor plug in any desired position. A spring 24 mounted on stem 22 exerts resilient pressure between cap 21 and the upper surface of plug 12 to hold the plug seated in bore 11.

The inlet and outlet ports in the casing are internally threaded to permit the attachment of the main gas supply to the inlet port 15 and the connection of each of the outlet ports to a ring of the multiple-ring gas burner. As is best shown in Figure 6, the outlet ports 16, 17, 18, 19, and 20 and inlet port 15 are positioned in a horizontal plane substantially in the center of the side wall of casing 10. The mouth of inlet port 15 (Figure 5) is enlarged so that it extends a substantial distance around the side wall of the casing in both directions, and the mouths of the inlet and outlet ports are positioned on substantially opposite sides of the casing.

A passageway, generally indicated at 60, which extends diametrically across plug 12, is used to connect the mouths of the inlet and outlet ports. This passageway has an enlarged mouth 61 at one end and extends through the distributor plug in a horizontal plane with its ends in alignment with the mouths of the inlet and outlet ports. A series of closure members 52, 53, 54, and 55 are positioned in enlarged mouth 61 adjacent bore 11 dividing that end of passageway 60 into a series of passages 32, 33, 34, 35, and 36. The width of the outer ends of the closure members is slightly greater than the diameter of the mouths of outlet ports 16, 17, 18, 19, and 20, and all of the closure members are of the same width. All of the mouths of outlet ports 16, 17, 18, 19, and 20 are of the same size and are spaced from each other by distances equal to the width of the outer ends of the closure members.

For purposes to be disclosed more fully hereinafter, the passage 32 and passageway 60 from passage 32 to mouth 33 at its other end, although of the same width as the mouths of passages 34, 35, 36, and 37, are oval shaped and have the same depth as the mouth 15a (Figure 6) of inlet port 15. This substantially increases the quantity of gas available to passages 34, 35, and 36 whenever passage 32 or mouth 33 is connected to the mouth 15a of inlet port 15.

By setting the distributor plug in different positions gas may be supplied to any single outlet port or to a series of outlet ports. In Figure 1 distributor plug 12 has been turned in a counterclockwise direction from a "shut-off" position so that mouth 33 of passageway 60 is connected to outlet port 16. As the distributor plug continues to move in a counterclockwise direction, full connection between mouth 33 and port 16 is attained after which the size of the opening between the two is reduced until mouth 33 is positioned between ports 16 and 17. During this time gas is entering passageway 60 through passages 35, 36, and 37 from the mouth 15a of port 15. By continuing counterclockwise movement of the distributor plug, mouth 33 may be connected to any of the outlet ports and the degree of the connection may be varied between open and closed positions. In Figure 2 mouth 33 is shown positioned between ports 17 and 18 in a closed position. Thus each ring of the burner may be individualy supplied with gas and the degree of flow of gas may be varied between fully open and closed positions.

In Figure 3 the valve is shown in a "shut-off" position after the connection between the mouth 33 of passageway 60 and outlet port 20 has been closed. Next by continued rotation of the distributor plug in a counterclockwise direction, the mouths of passages 37, 36, 35, 34, and 32 are consecutively brought into connection with outlet port 16. As the mouth of each passage passes beyond the mouth of outlet port 16, the passage mouth is closed and continued counterclockwise rotation causes it to connect with the following outlet port 17 (Figure 4). Thus, the outlet ports may be consecutively connected (Figure 4) to the mouths of passages 37, 36, 35, 34, and 32 in the distributor plug. In every case, before another outlet port is added to the series to which gas is being supplied, the mouths of the passages 32, 34, 35, 36, and 37 are shut off (Figure 5). As counterclockwise movement is continued from the position shown in Figure 4, the outlet ports are successively connected to and then shut off from the mouths of passages 37, 36, 35, 34, and 32, the connections between a series of outlet ports and plug passages opening and closing in unison.

As plug 12 is rotated in a counterclockwise direction from the position shown in Figure 4, the enlarged mouth of passage 32 (Figure 6) described hereinabove insures a sufficient supply of gas to passages 37, 36, and 35. As the connection between passage 32 and mouth 15a of inlet port 15 is being closed, mouth 33 of passageway 60 moves into communication with the lower end of mouth 15a. Again because of the enlarged size of passageway 60 (Figure 6) and the size of mouth 15a, sufficient gas is supplied to passages 32, 34, 35, 36, and 37 to fully supply the outlet ports.

Thus, any number of outlet ports may be successively supplied with gas and the amount of gas being supplied to a series of ports may be varied between open and closed positions. Furthermore, all of the outlet ports may be opened successively and then closed successively so that a variety of different combinations of the rings of the burner may be operated at one time. Also, any individual burner may be used and the amount of gas supplied to this burner may be varied between open and closed positions.

Referring to Figure 8 in which another embodiment of the valve described hereinabove is shown, the valve, generally indicated at 10a, is substantially the same as the valve shown in Figures 1–6 with the exception that in the present embodiment the outer ends of closure members 52a, 53a, 54a, and 55a are smaller than the width of the outlet ports 20a, 19a, 18a, 17a, and 16a, and the mouths of passages 32a, 34a, 35a, 36a, and 37a, and mouth 33a are wider than the portions of casing 10 separating the outlet ports. Thus, as the distributor plug 12a of this valve is rotated to connect the mouths of passageway 60a to the outlet ports, gas is not completely shut off at any time from the outlet ports by the closure members and mouth 33a supplies two outlet ports at the same time as it is moving from one outlet port to another. This eliminates the necessity of re-igniting the rings of a burner each time a new ring is added to the series to which gas is being supplied or when mouth 33a is moved from one outlet port to another. As in the valve shown in Figures 1–6, there are two positions of plug 12a at which all gas is cut off from the outlet ports.

A further variation of either the valve shown in Figures 1–6 or the valve shown in Figure 8 is achieved by forming interconnecting passages 70, 71, 72, and 73 (Figure 8) extending through the portions of casing 10 separating the outlet ports and thus interconnecting the outlet ports. With this type of construction when gas is supplied to one of the outlet ports, it immediately is fed to the others through the interconnecting passages. The passages are small so that each burner burns with a very low flame unless it is connected to one of the mouths of passage 60. This type of construction also eliminates re-ignition of the burners whenever a change is made in the setting of either plug 12 or 12a.

It might be pointed out here that the valves described hereinabove may be used to direct the flow of liquids and furthermore that if this valve is used as a mixing valve, the ports specified as outlet ports hereinabove may be used as the inlet ports of the valve and the inlet port used as the outlet port. Thus, it will be seen that a thoroughly practical and durable valve construction has been disclosed in which the several objects hereinabove mentioned, as well as many others, have been successfully accomplished.

As many possible embodiments may be made of the above invention, and as many changes might be made in the embodiment above set forth, or shown in the accompanying drawing, it is to be understood that all matter hereinbefore set forth, or shown in the accompanying drawing, is to be interpreted as illustrative and not in a limiting sense.

I claim:

1. In apparatus of the nature described, in combination, a casing, a distributor member rotatably mounted in said casing, a primary port and three or more secondary ports extending through said casing, said ports being positioned in a plane extending horizontally through said casing, and a passageway extending through said distributor member having an enlarged mouth, said passageway and its mouth being adapted to be moved into and out of registration with said primary and secondary ports, the axis of rotation of said distributor member being at right angles to the plane in which said ports are positioned, said passageway and its mouth being capable of connecting said primary port either with any individual secondary port or with any number of the secondary ports in series beginning with either of the outermost outlet ports.

2. In apparatus of the nature described, in combination, a casing, a distributor member rotatably mounted in said casing, said casing having a primary port and a plurality of secondary ports, said secondary ports all being of substantially the same diameter and being separated by distances slightly greater than the width of an individual secondary port, and a passageway extending through said distributor member having an enlarged mouth, the other end of said passageway having an opening of substantially the same diameter as the diameter of each of said secondary ports, the enlarged mouth and the opening in the other end of said passageway being capable of being moved into and out of registration with said primary and secondary ports, the enlarged mouth of said passageway being capable of successively connecting said secondary ports to said primary port until all of the secondary ports are connected to the primary port, the opening in the other end of said passageway being capable of connecting said primary port to any individual secondary port.

3. In apparatus of the nature described, in combination, a casing, a distributor member rotatably mounted in said casing, said casing having a primary port and a plurality of secondary ports, said secondary ports all being of substantially the same diameter and being separated by distances slightly greater than the width of an individual secondary port, and a passageway extending through said distributor member having an enlarged mouth, the other end of said passageway having an opening of substantially the same diameter as the diameter of each of said secondary ports, the enlarged mouth and the opening in the other end of said passageway being capable of being moved into and out of registration with said primary and secondary ports, the enlarged mouth of said passageway being capable of successively connecting said secondary ports to said primary port until all of the secondary ports are connected to the primary port, the opening in the other end of said passageway being capable of connecting said primary port to any individual secondary port, and a plurality of closure members positioned in the enlarged mouth of said passageway, said closure members being equidistantly spaced from each other and being capable of closing all of said secondary ports each time the distributor member is moved to add a new port to the series of ports opening into the enlarged mouth of said passageway.

4. In apparatus of the nature described, in combination, a casing, a distributor member rotatably mounted in said casing, a primary port positioned on one side of and extending through said casing, said primary port having an enlarged mouth, a plurality of secondary ports positioned on the opposite side of said casing, and a passageway extending through said distributor member having an enlarged mouth at one end, the mouth and opposite end of said passageway being adapted to be moved into and out of registry with the mouth of said primary and secondary ports, the mouth of said passageway being capable of being connected successively to said secondary ports until they are all open, further rotation of said distributor member successively closing said ports, and the opposite end of said passageway being capable of registration with each of said ports individually.

5. In apparatus of the nature described, in combination, a casing, a distributor member rotatably mounted in said casing, a primary port and four or more secondary ports extending through said casing, said ports being positioned in a plane extending horizontally through said casing, and a passageway extending through said distributor member having an enlarged mouth positioned at one end thereof, the mouth and opposite end of said passageway being adapted to be moved into and out of registration with said primary and secondary ports, the enlarged mouth of said passageway being capable of connecting said primary port with each of said secondary ports successively to successively open said ports until they are all open, and the opposite end of said passageway being capable of connecting said primary port with any individual secondary port.

6. In apparatus of the nature described, in combination, a casing, a distributor member rotatably mounted in said casing, said casing having a primary port and a plurality of secondary ports, said secondary ports all being of substantially the same diameter, and a passageway extending through said distributor member having an enlarged mouth, the other end of said passageway having an opening of substantially the same diameter as the diameter of each of said secondary ports, the enlarged mouth and the opening in the other end of said passageway being capable of being moved into and out of registration with said primary and secondary ports, the enlarged mouth of said passageway being capable of successively connecting said secondary ports to said primary port until all of the secondary ports are connected to the primary port, the opening in the other end of said passageway being capable of connecting said primary port to any individual secondary port, and a plurality of closure members positioned in the enlarged mouth of said passageway, said closure members being capable of registration with said outlet ports and being of smaller size than said outlet ports, whereby the closure members vary the flow of gas to said outlet ports as the distributor member is rotated without entirely cutting off the supply of gas thereto.

ARTHUR ROBERTS.